United States Patent [19]

Yoshida et al.

[11] 4,454,750

[45] Jun. 19, 1984

[54] APPARATUS FOR GENERATING A KNOCK SIGNAL FOR USE WITH AN INTERNAL COMBUSTION ENGINE

[75] Inventors: Kenichi Yoshida; Masaharu Asano; Kenji Yoneda, all of Yokosuka, Japan

[73] Assignee: Nissan Motor Co., Ltd., Yokohama, Japan

[21] Appl. No.: 367,922

[22] Filed: Apr. 13, 1982

[30] Foreign Application Priority Data

Apr. 14, 1981 [JP] Japan .................. 56-55082

[51] Int. Cl.³ .......................................... G01L 23/22
[52] U.S. Cl. ..................................................... 73/35
[58] Field of Search ................... 73/35; 123/425, 435

[56] References Cited

U.S. PATENT DOCUMENTS 4,343,278 10/1982 Asano .................................. 73/35
4,368,635 1/1983 Yoshida ............................... 73/35

FOREIGN PATENT DOCUMENTS 2061380 5/1981 United Kingdom .................. 73/35

Primary Examiner—Gerald Goldberg
Assistant Examiner—John E. Chapman, Jr.
Attorney, Agent, or Firm—Schwartz, Jeffery, Schwaab, Mack, Blumenthal & Koch

[57] ABSTRACT

An output signal of a vibration sensor mounted on an internal combustion engine is compared with a background noise reference signal to produce a knock signal which can accurately represent the intensity of knocking. The background noise level signal is produced by averaging a component of the vibration sensor output signal which represents the vibration of the engine other than knock-induced vibration. In order to produce a feedback signal for inhibiting the knock induced component of the sensor output signal, a first comparator compares the sensor output signal with a first reference signal having a sufficiently low level. Knock signal is produced by a second comparator which receives a second reference signal, which is proportional to the first reference signal but having sufficiently higher level, thereby enabling a precise determination of knock intensity.

4 Claims, 5 Drawing Figures

APPARATUS FOR GENERATING A KNOCK SIGNAL FOR USE WITH AN INTERNAL COMBUSTION ENGINE

BACKGROUND OF THE INVENTION

1. Field of the Invention

The present invention relates to an apparatus for generating a signal indicative of the intensity of knock occurring in an internal combustion engine.

2. Description of the Prior Art

Strong knocks occurring in an internal combustion engine cause harm to the engine. However, it is generally known in the art that the engine output performance and the fuel consumption characteristics are optimized when the engine is running under a slight knock condition.

In view of the fact that the occurrence of knocking is greatly dependent on the ignition timing, various systems have been proposed wherein the ignition timing is retarded upon detection of knocking.

In order to accurately determine the ignition timing in accordance with the intensity of knocking, apparatus is provided for precisely determining the intensity of knocking occurring in the internal combustion engine.

One technique that has been proposed for generating an accurate knock signal is amplification discrimination, in which an output signal of a vibration sensor mounted on the engine is compared with a noise reference signal at a comparator.

The noise reference signal masks most of the sensor output signal so that only peaks in the sensor output signal which are assumed to be mostly due to knock-induced vibration rising above the noise reference signal contribute to the knock signal.

This type of knock signal generating apparatus results in an improvement in signal to noise ratio of the knock signal.

However, a difficult problem in such amplification discrimination is to eliminate the influence of the peaks of the sensor output signal upon the voltage level of the background noise signal.

In other words, there is a tendency for the peaks of the sensor output signal resulting from knocking falsely increase the voltage level of the background to noise signal, and undesirably reduce the apparent amplitude and the frequency of knock signal which is produced at the output of the comparator.

SUMMARY OF THE INVENTION

An object of the present invention is therefore to improve the accuracy of detection of the intensity of knocking occurring in the engine, by employing a background noise signal having a voltage level precisely indicating the vibration of the engine other than knock induced vibration of the engine.

According to the present invention, an apparatus for generating knock signal, for use with an internal combustion engine having knock induced vibration comprises:

a vibration sensor mounted on the engine and responsive to both knock-induced vibrations and other vibrations to generate an output signal;

a reference signal generating means responsive to the output signal of the vibration sensor and operative to generate a first and a second reference signal each having a level proportional to the average amplitude of a component of the output signal of the vibration sensor representing vibration of the engine other than the knock-induced vibration, the reference signal generating means including switch means responsive to a switch control signal and operative to inhibit signals from the vibration sensor and hold the level of the signals from the vibration sensor directly before the application of the switch control signal, and operative to permit the signal from the vibration sensor to pass therethrough upon absence of the switch control signal;

a first comparator means operative for comparing the output signal of the vibration sensor with the first reference signal to produce an output signal when the output signal of the vibration sensor exceeds the first reference signal;

feedback means connected to the first comparator means and operative for producing the switch control signal from the output signal of the first comparator and for same to the switch means; and a second comparator means operative for comparing the output signal of the vibration sensor with the second reference signal to produce the knock signal, wherein the first reference signal is so determined as to be sufficiently lower than the component of the output signal of the vibration sensor representing the knock-induced vibration so that the output signal of the first comparator means includes a component due to a slight knocking, thereby eliminating the tendency that the peaks of the output signal of the vibration sensor due to knocking falsely raise the level of the first reference signal, and wherein the level of the second reference signal is so set as to be higher than the first reference signal level and adjusted at a suitable level so that the magnitude of the knock signal does not include the component due to slight knocking, thereby accurately represents the intensity of the knock induced vibration.

BRIEF DESCRIPTION OF THE DRAWINGS

The feature and advantages of the apparatus according to the present invention will become understood from the following description in conjunction with the preferred embodiments and the drawings in which like reference numerals designate like parts throughout all figures and in which.

DESCRIPTION OF THE PREFERRED EMBODIMENT

Figure 1:
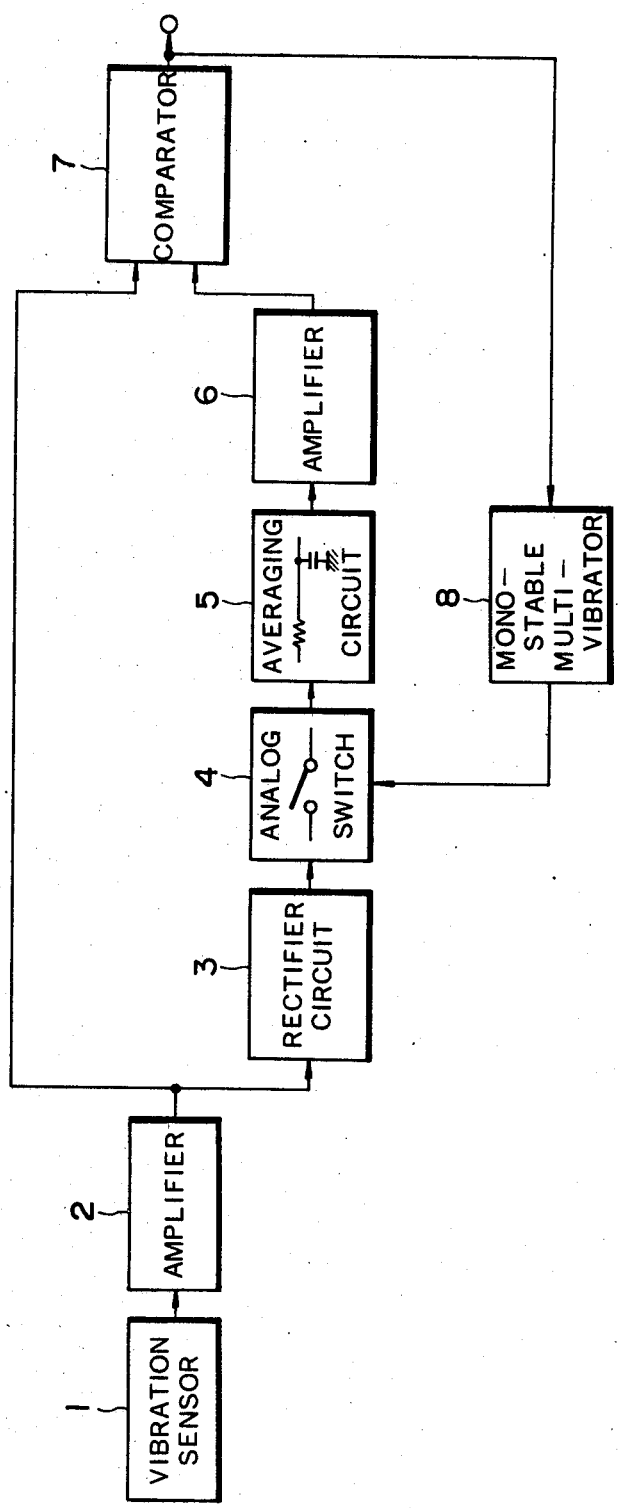
FIG. 1 is a block diagram of a prior art apparatus for generating a knock signal.
Figure 2:
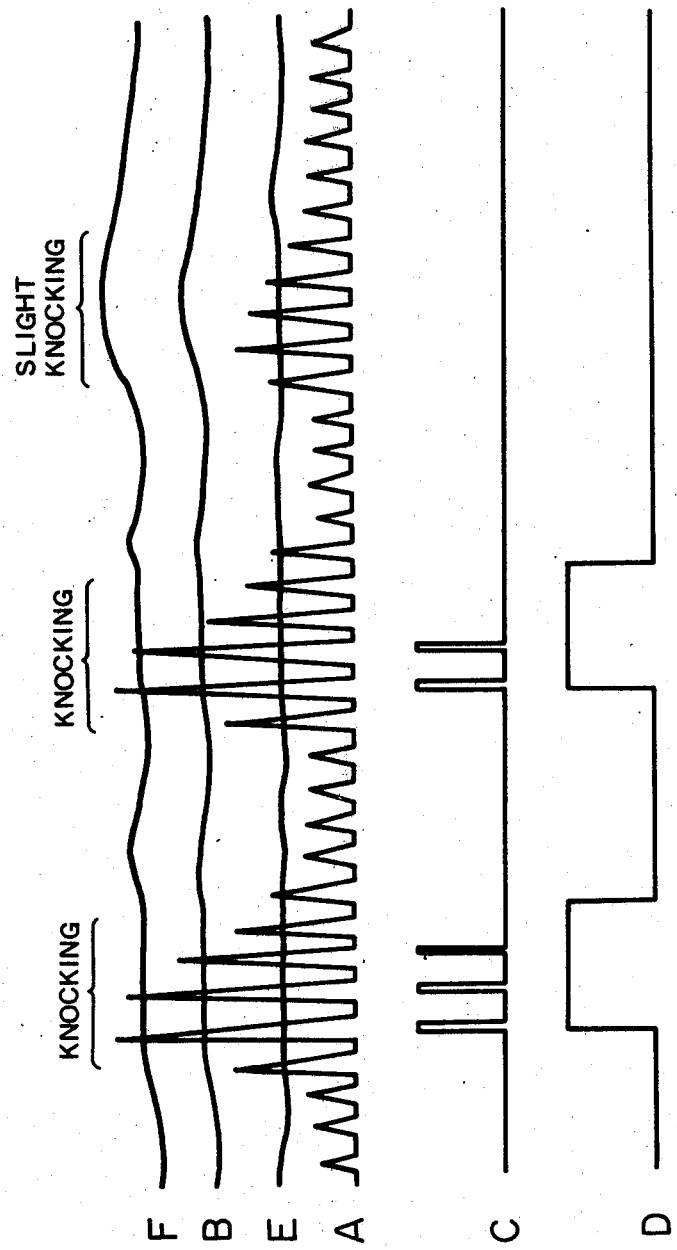
FIG. 2 is a timing chart showing the waveforms of signals appearing at various portion of the apparatus shown in FIG. 1.

Before entering into the description of preferred embodiments, reference is first made to FIGS. 1 and 2 in which there are illustrated a block diagram of a prior art apparatus for generating a knock signal and waveforms that appear at various positions of the apparatus.

As shown in FIG. 1, the apparatus comprises a vibration sensor 1 mounted on an internal combustion engine, an amplifier 2 connected thereto, and a background noise reference signal generator which receives the output signal of the amplifier 2, and a comparator 7 for producing a knock signal by comparing the output signal of the amplifier 2 with a background noise reference signal generated by the background noise reference signal generator.

The apparatus also includes a feedback means which comprises a monostable multivibrator 8 connected to the comparator 7.

The background noise reference signal generator includes a rectifier circuit 3 connected to the amplifier 2, an analog switch 4 connected to the rectifier circuit 3 and responsive to the output signal of the monostable multivibrator 8, an averaging circuit 5 connected to the output of the analog switch 4, and an amplifier 6 connected to the output of the averaging circuit 5.

As shown by the waveform A of FIG. 2, the output signal of the rectifier circuit 3 is a rectified signal having an amplitude proportional to the vibration of the engine.

The analog switch 4, whose operation is described hereinbelow, is provided for inhibiting the output signal of the rectifier circuit 3 when the engine knocks, so as to eliminate the influence of the vibration due to knock upon the background noise reference level.

The averaging circuit 5 receives the output signal of the rectifier circuit 3 through the analog switch 4 and translates it into a d-c voltage signal. The dc voltage level thereof may be adjusted by the amplifier 6 to form the background noise reference signal as shown by the waveform B of FIG. 2, for example.

The output signal of the amplifier 2 and the output signal of the amplifier 6, i.e., the background noise reference signal, are supplied to each of two inputs of the comparator 7. To indicate knock, the comparator 7 produces a rectangular pulse signal, as shown by the waveform C of FIG. 2, when the voltage level of the output signal of the amplifier 2 exceeds the voltage level of the background noise reference signal.

The output signal of the comparator 7 thus produced, which takes the form of a pulse train, is used for triggering the monostable multivibrator 8 also, and upon receiving the trigger signal it produces a rectangular pulse signal having a predetermined time duration, as shown by the waveform D of FIG. 2.

Referring to the operation of the analog switch 4, under a condition that the knock signal is not produced by the comparator 7, the monostable multivibrator 8 does not produce an output signal and the analog switch 4 remains closed, allowing the output signal of the rectifier circuit 3 to pass therethrough. Thus, during the time when knocking is not present, the background noise reference signal is produced by averaging the output signal of the rectifier circuit 3 which is assumed to be free from components due to knocking vibration.

On the other hand, when the knock signal is produced by the comparator 7, the analog switch 4 is supplied with the output signal of the monostable multivibrator 8. At that moment, the analog switch 4 inhibits the output signal of the rectifier circuit 3 and holds the level of the rectified signal immediately before the application of the output signal of the monostable multivibrator 8.

Accordingly, when knocking is present, the background noise reference signal is produced in accordance with the voltage level of the output signal of the rectifier circuit 3 which is held by the analog switch 4.

However, as previously mentioned, this apparatus has suffered from the problem that a knock signal produced by the comparator 7 does not alway indicate the intensity of knock-induced vibration accurately.

This is because of the inappropriateness of the voltage level setting of the background noise reference signal, which must precisely represent the noise level contained in the output signal of the vibration sensor and also must have a sufficiently low level for triggering the monostable multivibrator 8 in response to the rise in the engine vibration level due to knocking at the same time, in order to eliminate the influence of knocking upon the background noise signal.

For example, if the amplification rate of the amplifier 6 is low in order to reduce the voltage level of the background noise reference signal as shown by the waveform E of FIG. 2, the comparator 7 produces output signals, i.e., the knock signal, responsive to a component of the output signal of the vibration sensor which is much lower than the vibration level of knocking, thus deteriorating the accuracy of determination of knock intensity.

Conversely, if the amplification rate of the amplifier 6 is high in order to produce a high level background noise reference signal as shown by the waveform F of FIG. 2, the comparator 7 does not produce the output signal, i.e., the knock signal, until the voltage level of the output signal of the vibration sensor 1 rises to a level much higher than the vibration level due to knocking. In this case, the accuracy of determination of knock intensity is deteriorated too.

The present invention is based on the recognition of the above drawback of the prior art apparatus.

The preferred embodiments of the present invention will be explained in conjunction with FIGS. 3 to 5.

Figure 3:
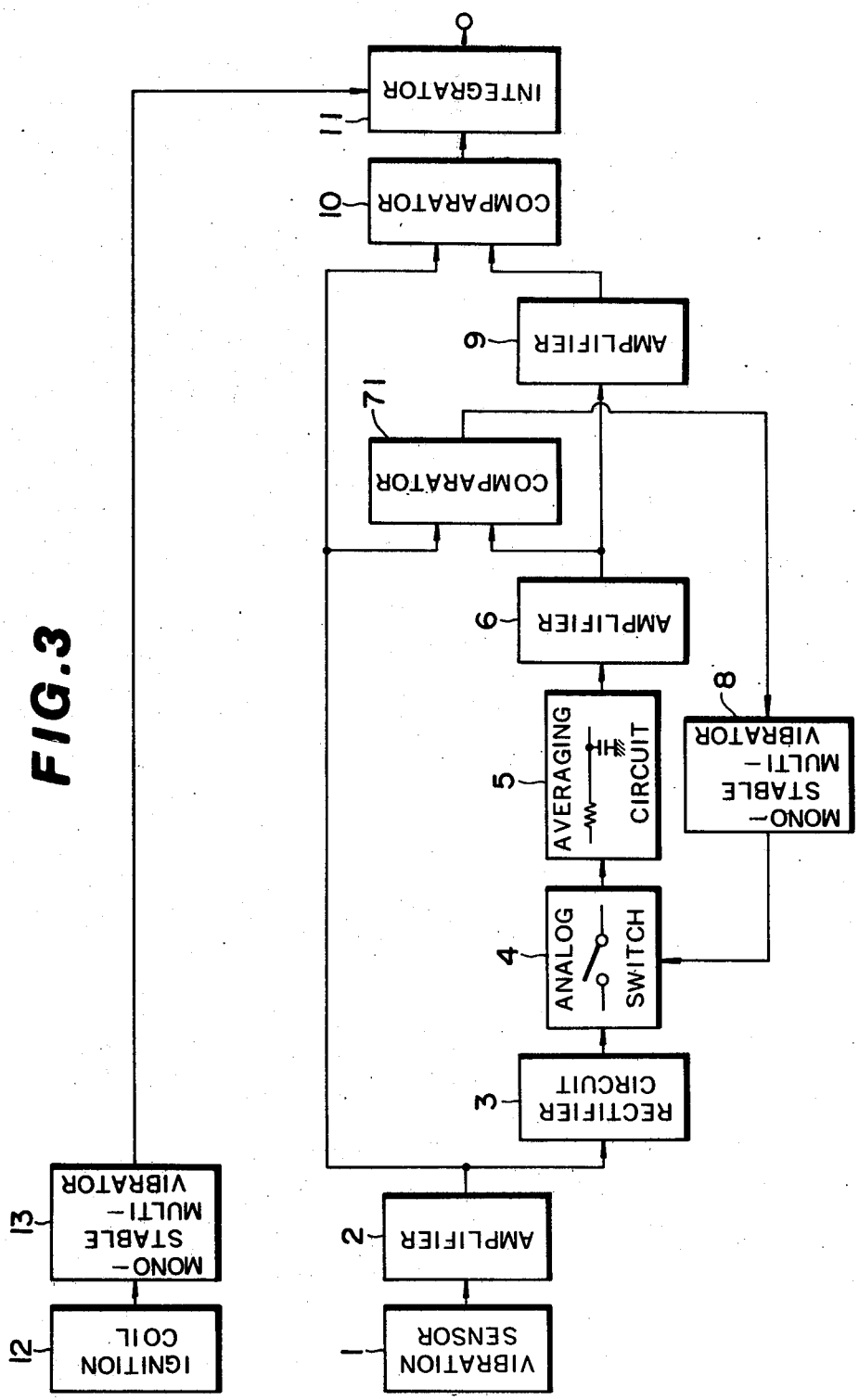
FIG. 3 is a block diagram of a first embodiment of the apparatus for generating a knock signal according to the present invention.
Figure 4:
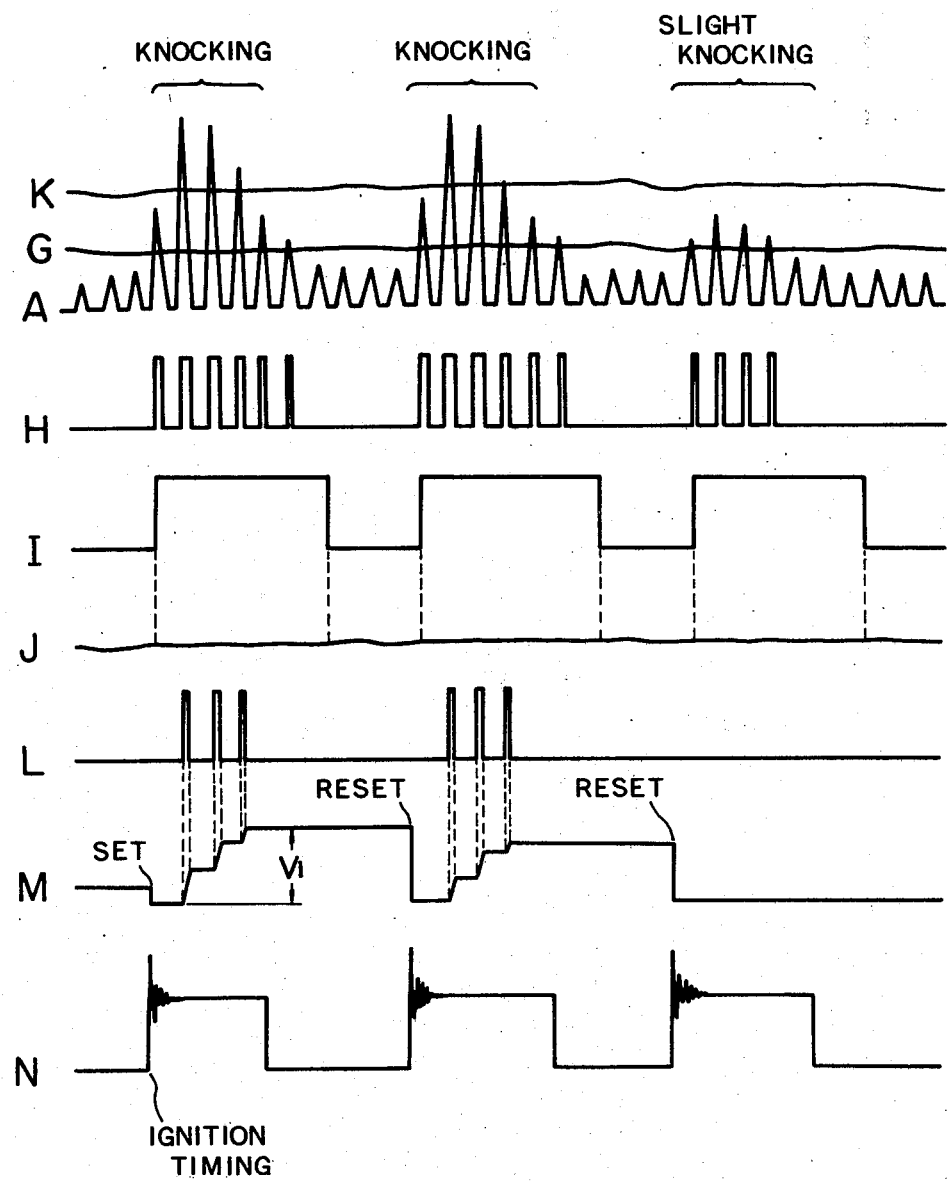
FIG. 4 is a timing chart showing waveforms of signals appearing at various portions of the apparatus shown in FIG. 3.

Referring to FIGS. 3 and 4, a first embodiment is explained.

As shown in FIG. 3, the apparatus according to the present invention comprises a vibration sensor 1 mounted on the engine, an amplifier 2 connected thereto, a reference signal generator including a rectifier circuit 3 connected to the amplifier 2, an analog switch 4 responsive to the output signal of a monostable multivibrator 8, an averaging circuit 5, amplifier 6 and a feedback means in the form of the monostable multivibrator 8.

Since the operation of each of these circuit portions is the same as that of the prior art apparatus, detailed descriptions thereof are omitted.

Preferably, the vibration sensor 1 is a resonant type vibration sensor which can resonate at a characteristic frequency of engine vibration due to knocking. However, the resonant type vibration sensor may be replaced by a combination of a non-resonant type vibration sensor and a bandpass filter which allows only the passage of a component of the output signal of the vibration sensor having a specified characteristic frequency of knocking vibration.

Further, in case a non-resonant type vibration sensor is employed, it is preferable that the bandpass filter is incorporated in the amplifier 2.

The first embodiment is characterized by the provision of a first and a second comparator 71 and 10 which receive the output signal of the amplifier 2 at one input thereof, and an amplifier 9 for amplifying and adjusting the voltage level of the output signal of the amplifier 6.

The first comparator 71 receives the output signal of the amplifier 6 at the other input thereof and produces a trigger signal for the monostable multivibrator 8.

The second comparator 10 receives the output signal of the amplifier 9 which is sufficiently higher than the output signal level of the amplifier 6 for producing a pulse train representing the occurence of knocking.

The output signal of the second comparator 10 is fed to an integrator 11 which is resetable by an ignition timing signal produced by an ignition coil 12 and a monostable multivibrator 13 connected thereto.

It will be appreciated that according to the present invention, filtering of the background which influences accuracy is carried out separately by two comparators.

The operation of the first embodiment will be described hereinbelow with reference to FIG. 4.

The amplification rate of the amplifier 6 which receives the output signal of the averaging circuit 5 is set relatively low so as to produce a first reference level signal having a relatively low level, as shown by waveform G of FIG. 4.

The first reference level signal produced by the amplifier 6 is applied to a second input of the comparator 71 which also receives the output signal of the amplifier 2.

When the voltage level of the output signal of the amplifier 2 exceeds the first reference level, the comparator 71 produces a high level output signal for triggering the monostable multivibrator 8. Practically, the output signal of the comparator 71 appears as a pulse train as shown by the waveform H of FIG. 4 and the monostable multivibrator 8 produces a rectangular pulse signal as shown by the waveform I in response to the output pulse train of the comparator 71.

It is to be noted that the voltage level of the first reference level signal is set sufficiently low by adjusting the amplification ratio of the amplifier 6 so that the monostable multivibrator 8 can be triggered even when the voltage level of the output signal of the amplifier 2 rises slightly with the occurrence of knocking of a very slight level.

Similar to the prior art apparatus, the analog switch 4 is opened to inhibit the output signal of the rectifier circuit 3 and hold the level thereof in accordance with the output signal of the monostable multivibrator 8.

Since the first reference signal is set at sufficiently low level, the analog switch 4 is immediately opened even if knocking of a very slight level is present, thus eliminating the undesirable influence of knocking upon the background noise reference signal.

The operation of the second comparator 10 and the amplifier 9 will now be described.

The amplifier 9 receives the output signal of the amplifier 6, i.e., the first reference signal and amplifies the voltage level thereof to produce a second reference level signal as shown by the waveform K of FIG. 2.

The voltage level of the second reference signal level is set to be higher than the first reference level but lower than the peaks of the output signal of the amplifier 2 due to knocking, and at a level appropriately representing the background noise signal component in the vibration sensor 1 output.

The output signal of the amplifier 9, i.e., the second reference level signal is applied to one of the inputs of the second comparator 10 which also receives the output signal of the amplifier 2.

When the voltage level of the output signal of the amplifier 2 exceeds the second reference level, the second comparator 10 produces an output signal in the form of a pulse train as shown by the waveform L of FIG. 4.

Since the voltage level of the second reference level signal is determined appropriately, the output signal of the comparator 10 precisely represents the intensity of knocking.

In order to produce a knock signal having a voltage proportional to the intensity of knocking, it is preferable to provide an integrator circuit 11 which receives the output signal of the second comparator 10. The integrator circuit 11 is reset by an ignition timing signal as shown by the waveform N of FIG. 4, supplied from the monostable multivibrator 13. A knock signal as shown by the waveform M of FIG. 4, which precisely represents the intensity of knocking, is thus produced.

Figure 5:
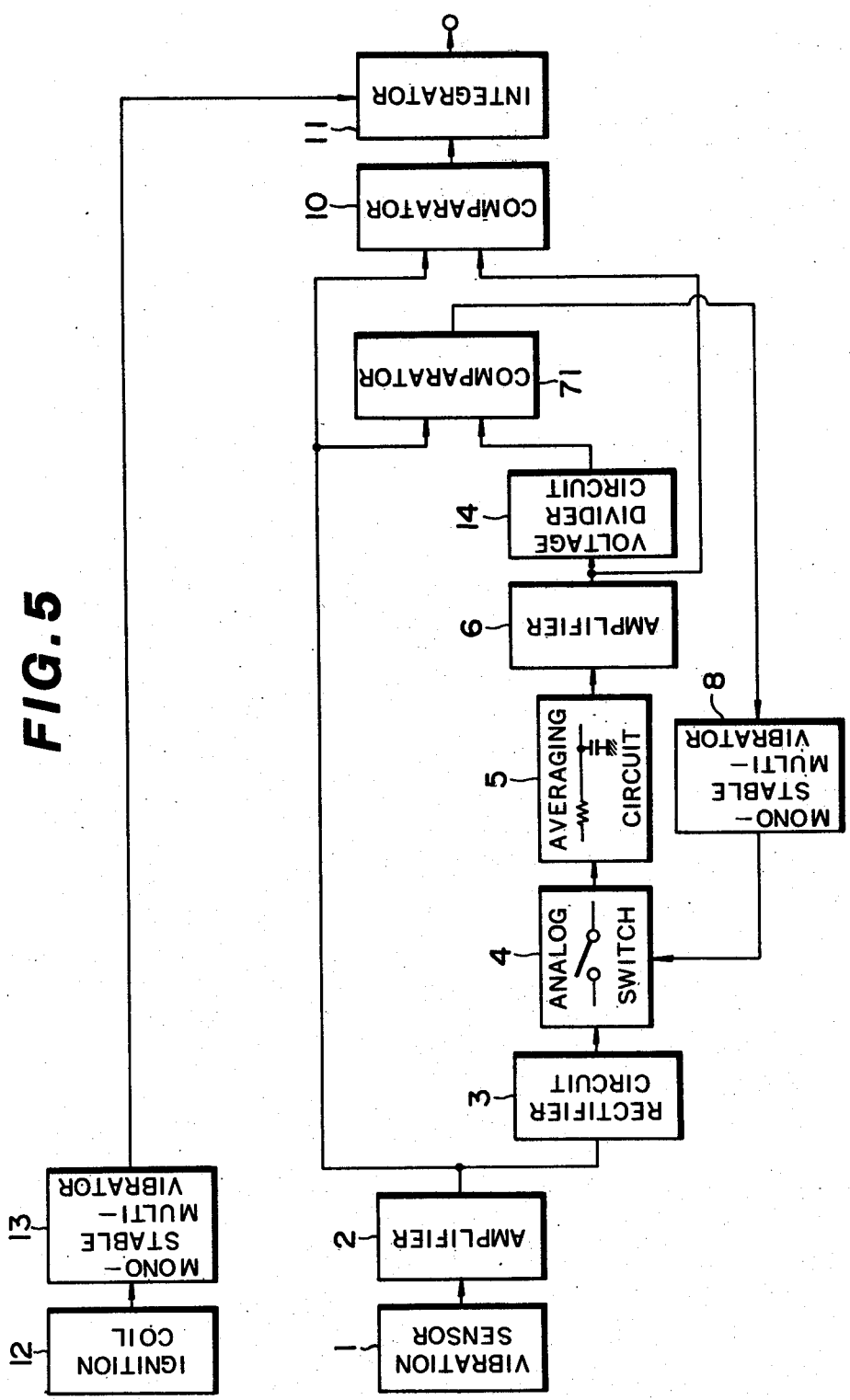
FIG. 5 is a block diagram of a second embodiment according to the present invention.

Turning to FIG. 5, a second embodiment of the present invention will now be explained.

The second embodiment features the provision of a divider circuit for producing the first reference signal from the second reference level signal.

As shown in FIG. 5, the output signal of the amplifier 6 connected to the averaging circuit 5, forms the second reference level signal which is applied directly to the input of the second comparator 10. This embodiment also features that the amplifier 9 utilized in the first embodiment is replaced by a voltage divider circuit 14.

The voltage divider circuit 14 is connected to the output of the amplifier 6 and divides the output signal of the amplifier 6, i.e., the second reference level signal into a suitable voltage level to form the first reference level signal.

The first reference level signal produced by the divider circuit 14 is received by the first comparator 71.

Since the operation of the second embodiment is the same as that of the first embodiment, the explanation thereof is omitted.

The voltage divider circuit 14 can be constructed by a series resistors connected to the output of the amplifier 6 and ground for reducing the output voltage level of the amplifier 6.

Therefore, the second embodiment has an advantage that it requires less component parts than the first embodiment and the manufacturing cost will be reduced.

What is claimed is:

1. An apparatus for generating a knock signal for use with an internal combustion engine having knock induced vibrations, comprising:
   a vibration sensor mounted on the engine and responsive to both said knock-induced vibrations and other vibrations to generate an output signal;
   reference signal generating means responsive to said output signal of the vibration sensor and operative to generate a first and a second reference signal, each having a level proprotional to the average amplitude of a component of said output signal of the vibration sensor representing engine vibration other than said knock-induced vibration, said reference signal generating means including switch means responsive to a switch control signal and operative to inhibit signals from said vibration sensor and to hold the level of signal from said vibration sensor directly before the application of said switch control signal in the presence of said switch control signal, and operative to permit signals from said vibration sensor to pass therethrough in the absence of said switch control signal;

a first comparator means operative for comparing said sensor output signal with said first reference signal to produce an output signal when said output signal of the vibration sensor exceeds said first reference signal;

feedback means connected to said first comparator means and operative for producing said switch control signal from said output signal of said first comparator means and for applying same to said switch means; and a second comparator means operative for comparing said output signal of said vibration sensor with said second reference signal to produce said knock signal, wherein said first reference signal is so set as to be sufficiently lower than the component of said output signal of said vibration sensor representing the knock-induced vibration so that the output signal of said first comparator means includes a component due to slight knocking, thereby eliminating the tendency of the peaks of said output signal of said vibration sensor due to knocking to falsely raise the level of said first reference signal, and wherein the level of said second reference signal is so set as to be higher than said first reference signal level and adjusted at a suitable level so that the magnitude of said knock signal does not include said component due to slight knocking, thereby accurately representing the intensity of said knock-induced vibration.

2. An apparatus as claimed in claim 1, further comprising an integrator responsive to the knock signal produced by said second comparator means and operative to produce an integrated knock signal by integrating said knock signal produced by said second comparator means, the voltage level of said integration signal representing the intensity of said knock induced vibration.

3. An apparatus as claimed in claim 1, wherein said switch means includes an analog switch and said reference signal generating means comprises:

a rectifier circuit connected to said vibration sensor and operative to produce a rectified signal by rectifying said sensor output signal;

said analog switch connected to said rectifier and operative to permit said rectified signal to pass therethrough in the absence of said switch control signal and operative to inhibit said rectified signal and hold the level of said rectified signal directly before the application of said switch control signal in the presence of said switch control signal;

an averaging circuit connected to said analog switch and operative to produce an averaged signal by averaging the output signal of said analog switch;

a first amplifier connected to said averaging circuit and operative to amplify said averaged signal to produce said first reference signal;

a second amplifier connected to receive said first reference signal and operative to produce said second reference signal having a level higher than the level of said first reference signal and adjusted at a level suitable to enable said knock signal to accurately represent the intensity of knock-induced vibration.

4. An apparatus as claimed in claim 1, wherein said switch means includes an analog switch and said reference signal generating means comprising:

a rectifier circuit connected to said vibration sensor and operative to produce a rectified signal by rectifying said sensor output signal;

said analog switch responsive to said rectifier and operative to permit said rectified signal to pass therethrough in the absence of said switch control signal and operative to inhibit said rectified signal from passing therethrough and hold the level of said rectified signal directly before the application of said switch control signal in the presence of said switch control signal;

an average circuit connected to said analog switch and operative to produce an averaged signal by averaging the output signal of said analog switch;

an amplifier connected to said averaging circuit and operative to amplify said averaged signal to produce said second reference signal having a suitable level for producing said knock signal accurately representing the intensity of knock-induced vibration; and a voltage dividing circuit connected to said amplifier and operative to divide said second reference signal to produce said first reference signal having a level sufficiently lower than the average level of the component of the sensor output signal representing the knock-induced vibration.

* * * * *